2,752,381

ORTHOSILICATE ESTERS

William J. Peppel, Austin, Tex., and Richard S. Schiefelbein, Wilmington, Del., assignors to Jefferson Chemical Company, Inc., New York, N. Y., a corporation of Delaware No Drawing. Application March 11, 1954,
Serial No. 415,686

19 Claims. (Cl. 260—448.8)

This invention relates to synthetic liquids suitable for use as lubricants, lubricant additives, lubricant extenders and as hydraulic fluids in brakes, shock absorbers and hydraulic transmissions, or as a cooling liquid for liquid cooled internal combustion engines, and more particularly to orthosilicate esters having properties which render them suitable for such uses.

It is an object of this invention to provide orthosilicate esters which combine to an exceptional and unusual extent the following desirable properties:

(1) Good viscosity characteristics over a wide temperature range, i. e., relatively high viscosity index, namely, above 100;

(2) High flash point; and (3) Thermal stability, i. e., resistance to oxidation at high temperatures of the order of 600° F.

It is another object of this invention to provide novel processes for producing such orthosilicate esters.

Other objects and advantages of this invention will be apparent from the following detailed description thereof.

In accordance with the present invention, it has been discovered that orthosilicate esters having the structural formula

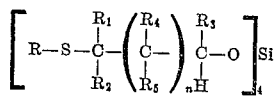

in which R is an alkyl group containing from 2 to 8, preferably from 3 to 6, carbon atoms; $R_1$, $R_2$, $R_3$, $R_4$ and $R_5$ are either hydrogen, methyl or ethyl, $n$ is either 0, 1, or 2 and in which the total number of carbon atoms in the ester molecule is 20 to 60, preferably 20 to 40, possess to a surprising extent the combination of desirable properties hereinabove set forth. The preferred silicate esters have the following formula

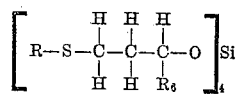

in which R has the value above noted and $R_6$ is hydrogen or methyl.

The present invention involves not only the discovery that the above defined orthosilicate esters possess to a surprising extent the combination of the desirable properties hereinabove enumerated, but also the discovery of these esters as new compounds. As indicated, these new compounds find utility not only as lubricants, lubricant extenders and additives, but also as fluids for use in brake, shock absorber and fluid transmission systems and as cooling liquids for liquid-cooled internal combustion engines.

The esters embodying this invention may be prepared by reacting an alkylmercapto alkanol with silicon tetrachloride, and heating, if necessary, until hydrogen chloride ceases to be evolved. The alkyl substituent of the alkylmercapto alkanol may contain from 2 to 8, preferably from 3 to 6, carbon atoms and the alkanol may contain from 2 to 6, preferably from 2 to 4, carbon atoms. In this reaction of alkylmercapto alkanols with silicon tetrachloride, particularly in connection with the production of the 2-alkylmercapto-ethanols, provision should be made for the rapid elimination of the hydrogen chloride evolved, because hydrogen chloride reacts readily with the 2-alkylmercapto alkanol to form a 2-alkylmercapto alkyl chloride. Accordingly, the esterification may be carried out in the presence of a reagent, such as pyridine, quinoline or other tertiary base, capable of combining with the hydrogen chloride as it is liberated. In carrying out the reaction of silicon tetrachloride with the alkylmercapto alkanol in the presence of an acid acceptor, such as pyridine, quinoline, etc., the temperature is not critical but is preferably maintained at about room temperature (20°–30° C.) by cooling. The reaction is rapid and usually takes place in an hour or less. The hydrogen chloride liberated is taken up by the acid acceptor and no hydrogen chloride is evolved from the reaction mixture.

Alternatively, the reaction of the alkylmercapto alkanol and the silicon tetrachloride may be carried out in the presence of a low boiling (e. g., boiling below about 55° C.) inert reaction medium, such, for example, as methylene chloride, butyl chloride, pentane, hexane, etc., which, when heated to the refluxing temperature of the reaction mixture, flushes out the hydrogen chloride. Desirably, the low boiling inert reaction medium vapors are condensed and returned as reflux while the hydrogen chloride is allowed to escape.

The reaction of the silicon chloride with the alkylmercapto alkanols is preferably carried out at atmospheric pressure and a temperature within the range of from 40° to 50° C. Higher or lower pressures could be used, if desired; also lower or higher temperatures may be used. However, since silicon chloride boils at about 56° C., a reaction temperature above about 50° C. should not be used, unless increased pressure is also used.

The reactants are mixed in proportions to provide an excess of the alkylmercapto alkanol over the silicon tetrachloride in order to insure that complete substitution of chlorine takes place. An excess of 0.1 to 1.0 mol of alkylmercapto alkanol over and above the stoichiometric amount required for reaction with the silicon tetrachloride will be found adequate. Hence, the reactants are desirably mixed in the proportions of 4.1 to 5 mols of the alkylmercapto alkanol to 1 mol of silicon tertachloride.

In those cases where the reaction is carried out in the absence of an acid acceptor, it is continued until hydrogen chloride ceases to be evolved; this indicates that the reaction has been completed.

The esterification may be carried out in the presence of a solvent for the reactants, such as benzene, petroleum ether, xylene, chloroform, carbon tetrachloride, ethylene dichloride, etc., although such solvents are not necessary.

They are preferably employed when using an acid acceptor, such as pyridine, quinoline, etc.

The esters may also be prepared by reacting an alkylmercapto alkanol with an orthosilicate alkyl ester. Any orthosilicate alkyl ester derived from an alcohol whose boiling point is lower than that of the desired product or of the alkylmercapto alkanol is suitable. The methyl and ethyl orthosilicates are preferred, but other orthosilicates, such, for example, as the propyl, isopropyl, n-butyl, isobutyl, sec-butyl, etc., orthosilicate esters can be used.

The beta-alkylmercapto alkanol intermediate may be prepared, for example, by reacting a mercaptan, such as ethyl, propyl, butyl, amyl, hexyl, heptyl or octyl mercaptan with ethylene oxide or propylene oxide to form the corresponding beta-alkylmercapto ethanol. The beta-alkylmercapto alkanol can also be made by treating the sodium salt of 2-mercaptoethanol or homologous mercapto alkanols with alkyl halides, such as the chloride or bromide. The gamma-alkylmercapto alkanols may be prepared by addition of the alkylmercaptan to allyl alcohol producing 3-alkylmercapto propanol. The addition of an alkylmercaptan to alkyl vinyl carbinol results in the production of 1-alkyl 3-mercaptoalkyl propanol.

Suitable alkylmercapto alkanol intermediates employed in producing the esters of this invention are as follows:

$$RS-CH_2CH_2OH$$

2-alkylmercapto ethanol $$RS-CH_2-CH_2-\underset{CH_3}{CHOH}$$

1-methyl, 3-alkylmercapto propanol $$RS-CH_2-CH_2CH_2CH_2OH$$

4-alkylmercapto butanol $$RS-CH_2-CH_2-CH_2CHCH_3-OH$$

1-methyl, 4-alkylmercapto butanol $$RS-CH_2-CH_2CHCH_3-CH_2OH$$

2-methyl, 4-alkylmercapto butanol $$RS-CH_2-CHCH_3-CH_2-CH_2OH$$

3-methyl, 4-alkylmercapto butanol $$RSCHCH_3-CH_2-CH_2-CH_2-OH$$

4-methyl, 4-alkylmercapto butanol $$RSCH_2-CHCH_3-CH_2-OH$$

2-methyl, 3-alkylmercapto propanol $$RSCH_2CH_2CH_2OH$$

3-alkylmercapto propanol $$RSCH_2\underset{|}{\overset{CH_3}{CH}}\ OH$$

1-methyl, 2-alkylmercapto ethanol $$RS\underset{|}{\overset{CH_3}{CH}}-\underset{|}{\overset{CH_3}{CH}}\ OH$$

1,2-dimethyl, 2-alkylmercapto ethanol

In the above formula R is an alkyl group containing from 2 to 8 carbon atoms, preferably 3 to 6 carbon atoms. R may be ethyl, propyl, butyl, isobutyl, n-amyl, 3-methylbutyl, 2-methylbutyl, etc.

From the above, it will be noted, the process aspects of this invention involve the reaction of an alkylmercapto alkanol with an esterification reagent, namely, either silicon tetrachloride or a low molecular weight alkyl orthosilicate. The latter reaction may be represented by the equation:

$$4RSR^7OH + Si(OR^8)_4 \rightarrow (RSR^7O)_4Si + 4R^8OH$$

in which R has the value above noted, $R^7$ is an alkylene radical containing from 2 to 5 carbon atoms and $R^8$ is an alkyl group containing from 1 to 4 carbon atoms.

This invention includes mixtures of the orthosilicate esters of (1) only alkylmercapto alkanols, (2) both alkoxy alkanols and alkylmercapto alkanols, and (3) alkanols and alkylmercapto alkanols. Such mixtures may be prepared by reacting a mixture of (1) alkylmercapto alkanols, (2) alkoxy alkanols and alkylmercapto alkanols, or (3) both alkanols and alkylmercapto alkanols with silicon tetrachloride. By adjusting the concentration of the constituents of the mixture, a lubricant may be obtained having a precise combination of desirable properties. Alkoxyalkanols employed in such mixture may be prepared by reacting an aliphatic alcohol containing from 4 to 8 carbon atoms with ethylene oxide or propylene oxide, or in any other suitable manner.

The following examples are given for the purpose of illustrating the preparation of the orthosilicate esters embodying the present invention. In these examples the properties of the esters are given chiefly for the purpose of demonstrating that they combine to an exceptional extent the properties hereinabove enumerated which render them eminently satisfactory for use as synthetic lubricants. It is to be understood that the invention is not limited to these examples.

In the examples all parts are by weight.

*Example I.—2-n-butylmercapto ethyl orthosilicate*

A solution of 98 parts (0.73 mol) of 2-n-butylmercapto ethanol and 57.5 parts (0.73 mol) of anhydrous pyridine in 75 parts of dry benzene were agitated at a temperature of below 20° C. while 30.4 parts (0.18 mol) of silicon tetrachloride were introduced over a one hour period. After standing 2 hours the precipitated pyridine hydrochloride was dissolved by adding 400 parts of water. The resulting two layers were separated and the organic layer was washed with water. After drying the organic layer over sodium sulfate, the benzene, excess pyridine and unreacted 2-n-butylmercapto-ethanol were removed by distillation. The remaining orthosilicate ester was then topped at 200° C. and 0.5 mm. pressure for ½ hour. After cooling to room temperature the liquid was filtered through a filter-aid to give 81 parts (80.2%) of 2-n-butylmercapto ethyl orthosilicate. The properties of this ester are given in Table 1.

*Example II.—2-isobutylmercapto ethyl orthosilicate*

This example differed from Example I chiefly in the substitution of substantially the same number of mols of 2-isobutylmercapto ethanol for the 2-n-butylmercapto ethanol of Example I. Otherwise the conditions were substantially the same. A yield of 67.2% of 2-isobutylmercapto ethyl orthosilicate was obtained. The properties of this ester are given in Table 1.

*Example III.—Preparation of 2-(isobutylmercapto) ethyl orthosilicate by transesterification*

A mixture of 226 grams (1.68 mols) of 2-isobutylmercapto-ethanol, 83.2 grams (0.40 mol) of ethyl orthosilicate and 0.27 gram (0.002 mol) of potassium carbonate was heated for 11 hours while removing 82 grams of distillate, chiefly ethanol, produced in the reaction through a 2-foot packed column. The excess 2-isobutylmercapto-ethanol was then removed by distillation. The remaining orthosilicate ester was topped at 200° C. and 1.0 mm. pressure for ½ hour. There remained 196 grams (87.5% yield) of 2-(isobutylmercapto) ethyl orthosilicate. This ester was treated with decolorizing charcoal and filtered. The properties of this ester are substantially the same as those of the corresponding ester prepared from silicon tetrachloride, as will be noted from the data given in Table 1 hereinafter.

*Example IV.—2-isoamylmercapto ethyl orthosilicate*

This example differed from Example I chiefly in the substitution of the same number of mols of 2-isoamylmercapto ethanol for the 2-n-butylmercapto ethanol of Example I. Otherwise the conditions of the example were substantially the same. A yield of 81.8% of 2-isoamylmercapto ethyl orthosilicate was obtained. The properties of this ester are given in Table 1.

*Example V.—2-n-amylmercapto ethyl orthosilicate*

This example differed from Example I in the substitution of substantially the same number of mols of 2-n-amylmercapto ethanol for the 2-n-butylmercapto ethanol of Example I. Otherwise the conditions of the example were substantially the same. A yield of 67.5% of 2-n-amylmercapto ethyl orthosilicate was obtained. The properties of this ester are given in Table 1.

*Example VI.—2-(2-ethylhexylmercapto) ethyl orthosilicate*

To a mixture of 150 grams of methylene chloride and 141 grams (0.74 mol) of 2-(2-ethylhexylmercapto) ethanol, prepared from 2-ethylhexyl chloride and 2-mercapto ethanol, was added over 1.5 hours 29.8 grams (0.175 mol) of silicon tetrachloride while maintaining the temperature at 40°–50° C. The methylene chloride and hydrogen chloride vapors pass through a 10″ Vigreaux column. The methylene chloride was condensed while the hydrogen chloride passed out as a non-condensible gas. After refluxing one hour the methylene chloride and excess 2-(2-ethylhexylmercapto) ethanol were recovered by distillation. After topping the ester was filtered and gave a yield of 83.7% of 2-(2-ethylhexylmercapto)-ethyl orthosilicate. The properties of this ester are given in Table 1.

*Example VII.—1-methyl-2-(n-butylmercapto) ethyl orthosilicate*

To a mixture of 350 grams of methylene chloride and 350 grams (2.36 mols) of 1-methyl-2-(n-butylmercapto) ethanol (prepared from n-butyl chloride and 2-hydroxypropanethiol-1) was added over 1.5 hours 95 grams (0.56 mol) of silicon tetrachloride keeping the temperature at 40°–50° C. The evolved hydrogen chloride was swept out of the system by the methylene chloride which was condensed and returned to the reaction mixture. After refluxing one hour the methylene chloride and excess 1-methyl-2-(n-butylmercapto) ethanol were recovered by distillation. After topping at 220° C. and 0.5 mm. for 0.5 hour the ester was cooled and filtered to give 265 grams (76.9%) of 1-methyl-2-(n-butylmercapto) ethyl orthosilicate. The properties of this ester are given in Table 1.

*Example VIII.—3-(n-butylmercapto) propyl orthosilicate*

To a stirred solution of 218 grams (1.47 mols) of 3-(n-butylmercapto)-propanol in 375 grams of methylene chloride, 59.5 grams (0.35 mol) of silicon tetrachloride were added over a 1½ hour period. During the addition of the silicon tetrachloride the reaction temperature was maintained at 45°–50° C. and hydrogen chloride was continuously removed overhead. The reaction mixture was stirred and refluxed at 45°–50° C. for one hour after the addition of the SiCl$_4$. Methylene chloride was then removed by distillation at atmospheric pressure and the unreacted alcohol was recovered by vacuum distillation. After the removal of the unreacted alcohol the ester was stripped at a pot temperature of 200° C. and a pressure of 1 mm. for ½ hour. The orthosilicate ester was cooled and filtered through Celite to remove the small amount of silica contained in the product. This example yielded 200 grams (92.5% yield based on silicon tetrachloride) of 3-(n-butylmercapto) propyl orthosilicate. The properties of this ester are given in Table 1.

Substitution of 3-(isopropylmercapto) propanol or 3-(n-propylmercapto) propanol for the 3-(n-butylmercapto) propanol of the above example resulted in yields of 81% 3-(isopropylmercapto) propyl orthosilicate and 86% of 3-(n-propylmercapto) propyl orthosilicate. The properties of these propyl orthosilicates are given in Table 1.

TABLE 1

| Ester | Viscosity, cs., ° F. | | | | | Visc. Index | Pour Point, ° F. | Flash Point, ° F. |
| --- | --- | --- | --- | --- | --- | --- | --- | --- |
| | 210 | 100 | 0 | −40 | −65 | | | |
| 2-n-butylmercapto ethyl orthosilicate | 2.80 | 7.90 | 55.0 | 281 | 1,020 | 206 | −90 | 520 |
| 2-isobutylmercapto ethyl orthosilicate from silicon tetrachloride | 2.84 | 8.93 | 80.5 | 424 | 2,070 | 181 | −90 | 505 |
| 2-isobutylmercapto ethyl orthosilicate from ethyl orthosilicate | 2.93 | 9.21 | 83.3 | 447 | 2,060 | 185 | −90 | 455 |
| 2-isoamylmercapto ethyl orthosilicate | 2.87 | 11.3 | 120.0 | 746 | 3,620 | 109 | −90 | 465 |
| 2-n-amylmercapto ethyl orthosilicate | 3.16 | 10.2 | 94.6 | 472 | 1,850 | 176 | −90 | 495 |
| 2-(2-ethylhexylmercapto) ethyl orthosilicate | 4.52 | 18.1 | 340 | 2,800 | 20,600 | 181 | −90 | 545 |
| 1-methyl-2-(n-butylmercapto) ethyl orthosilicate | 3.32 | 11.8 | 248 | 980 | 5,400 | 172 | −90 | 485 |
| 3-(n-butylmercapto) propyl orthosilicate | 3.37 | 10.9 | | | 1,716 | 209.5 | −90 | 550 |
| 3-(isopropylmercapto) propyl orthosilicate | 3.08 | 10.07 | | | 2,254 | 182.5 | −90 | 490 |
| 3-(n-propylmercapto) propyl orthosilicate | 3.02 | 9.33 | | | 1,270 | 194 | −90 | 460 |

Properties of other orthosilicate esters embodying this invention are given in the following Table 2.

TABLE 2

| Ester | Viscosity, cs., ° F. | | | Visc. Index | Pour Point, ° F. | Flash Point, ° F. |
| --- | --- | --- | --- | --- | --- | --- |
| | 210 | 100 | −65 | | | |
| 3-tert.-butylmercapto propyl orthosilicate | 4.73 | 21.12 | 39,988 | 160 | −80 | 485 |
| 1-methyl, 3-tert.-butylmercapto propyl orthosilicate | 6.38 | 35.84 | | 132.4 | <−90 | 460 |
| 1-methyl, 3-n-butylmercapto propyl orthosilicate | 3.44 | 12.67 | 6,500 | 169 | <−90 | |

*Example IX.—Mixed orthosilicate esters derived from 60 parts of 2-n-butylmercapto ethanol and 40 parts of 2-isobutylmercapto ethanol*

A solution of 84.5 parts (0.63 mol) of 2-n-butylmercapto ethanol, 56.3 parts (0.42 mol) of 2-isobutylmercapto ethanol, and 83 parts (1.05 mols) of anhydrous pyridine in 75 parts of dry benzene was agitated keeping the temperature at less than 20° C. while 42.5 parts (0.25 mol) of silicon tetrachloride was introduced over a one hour period. After standing 2 hours, the precipitated pyridine hydrochloride was dissolved by adding 400 parts of water. The resulting two layers were separated, and the upper organic layer was washed with water. After drying the organic layer over sodium sulfate the benzene and excess pyridine and unreacted isomeric 2-butylmercapto ethanols were removed by distillation. The remaining mixed silicate ester was then topped at 200° C. and 0.5 mm. pressure for ½ hour. After cooling to room temperature the liquid was filtered through filter aid to give 131 parts (93.5%) of the mixed 2-n-butylmercapto and 2-isobutylmercapto ethyl orthosilicate ester. The properties of this mixed ester are given in Table 3.

Mixed esters were also prepared of the following compositions: 25% 3-(t-butylmercapto) propyl and 75% 3-(n-butylmercapto) propyl orthosilicate ester, 43% 3-(t-butylmercapto) propyl and 57% 2-ethylhexyl orthosilicate ester, and 46% 3-(t-butylmercapto) propyl and 54% 2-(n-butoxy)-ethyl orthosilicate ester. The properties of these mixed esters are given in Table 3.

TABLE 3

| Ester | Viscosity, cs., −65° F. | Visc. Index | Flash Point, ° F. |
|---|---|---|---|
| 2-n-butylmercapto ethyl (60%), 2-isobutylmercapto ethyl (40%) orthosilicate | 1,270 | 171 | 495 |
| 3-(t-butylmercapto) propyl (25%), 3-(n-butylmercapto) propyl (75%) orthosilicate | 2,948 | 163 | 440 |
| 3-(t-butylmercapto) propyl (43%), 2-ethylhexyl (57%) orthosilicate | 3,426 | 117 | 430 |
| 3-(t-butylmercapto) propyl (46%), 2-(n-butoxy) ethyl (54%) orthosilicate | 1,716 | 161 | 380 |

The synthetic lubricants prepared in accordance with the present invention were found to be stable at elevated temperatures. For example, they were evaluated by the well known Pratt & Whitney Panel Coking Test. This involves measuring the resistance of an oil to high temperature oxidation by splashing the oil on a heated aluminum test panel at a temperature of about 600° F. for 10 hours. After washing the cooled panel with petroleum ether, the weight of the resultant deposit on the panel is taken as a measure of the temperature stability of the oil. The 2-n-butylmercapto ethyl orthosilicate of Example I, when so tested gave a residue of 15.5 mg. 1-methyl 2-(n-butylmercapto) ethyl orthosilicate when so tested gave a residue of 18.4 mg. For comparative purposes the test was also run with AEO 120 oil (a mineral oil of viscosity 120 Saybolt Seconds Universal at 210° F. commonly employed as an airplane engine oil) as a reference oil. This oil left a residue of 102.2 mg.

From the above data it will be apparent that the synthetic lubricants of this invention combine to an exceptional extent the following desirable properties:

1. Good viscosity characteristics over a wide temperature range, i. e., a relatively high viscosity index, namely, above 100;
2. High flash point; and
3. Resistance to oxidation at high temperatures.

In addition to the utility of the orthosilicate esters of this invention as synthetic lubricants per se, they are completely miscible with mineral lubricating oils. Accordingly, they are useful as extenders for lubricants and also as additives to lubricating oils for the purpose of imparting desirable properties thereto. In view of their heat stability the orthosilicate esters of this invention are useful as heat transfer media, as hydraulic fluids in brakes, shock absorbers and hydraulic transmissions and for other purposes.

Since certain changes in carrying out the above process, and certain modifications in the synthetic lubricants which embody the invention may be made without departing from its scope, it is intended that all matter contained in the above description shall be interpreted as illustrative and not in a limiting sense.

What is claimed is:

1. A synthetic liquid having a high viscosity index, a high flash point and resistant to oxidation consisting essentially of an orthosilicate ester having the following formula

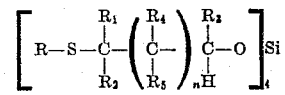

in which R is an alkyl group containing from 2 to 8 carbon atoms, $R_1$, $R_2$, $R_3$, $R_4$ and $R_5$ are from the group consisting of hydrogen, methyl and ethyl, $n$ is an integer from 0 to 2, inclusive, and the total number of carbon atoms in the ester molecule is from 20 to 60.

2. A synthetic liquid having a high viscosity index, a high flash point and resistant to oxidation consisting essentially of an orthosilicate ester having the following formula

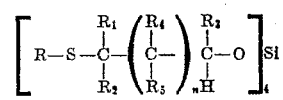

in which R is an alkyl group containing from 2 to 8 carbon atoms $R_1$, $R_2$, $R_3$, $R_4$ and $R_5$ are from the group consisting of hydrogen, methyl and ethyl, $n$ is an integer from 0 to 2, inclusive, and the total number of carbon atoms in the ester molecule is from 20 to 40.

3. A synthetic lubricant having a high viscosity index, a low pour point, a high flash point and resistant to oxidation consisting essentially of an orthosilicate ester having the following formula

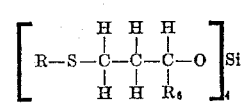

in which R is an alkyl group containing from 2 to 8 carbon atoms and $R_6$ is a member of the group consisting of hydrogen and methyl.

4. A synthetic lubricant having a high viscosity index, a high flash point and resistant to oxidation consisting essentially of a mixture of orthosilicate esters having the following formula

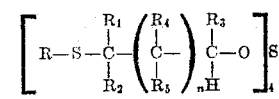

in which R is an alkyl group containing from 2 to 8 carbon atoms, $R_1$, $R_2$, $R_3$, $R_4$ and $R_5$ are from the group consisting of hydrogen, methyl and ethyl, $n$ is an integer from 0 to 2, inclusive, and the total number of carbon atoms in the ester molecule is from 20 to 60.

5. A synthetic lubricant having a high viscosity index, a high flash point and resistant to oxidation comprising a mixture of orthosilicate esters having the following formula

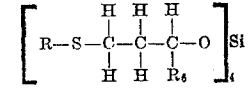

in which R is an alkyl group containing from 2 to 8 carbon atoms and $R_6$ is a member of the group consisting of hydrogen and methyl.

6. As a new compound the orthosilicate ester having the following formula

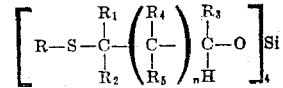

in which R is an alkyl group containing from 2 to 8 carbon atoms, $R_1$, $R_2$, $R_3$, $R_4$ and $R_5$ are from the group consisting of hydrogen, methyl and ethyl, $n$ is an integer from 0 to 2, inclusive, and the total number of carbon atoms in the ester molecule is from 20 to 60.

7. As a new compound the orthosilicate ester having the following formula

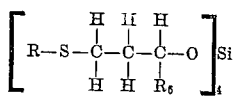

in which R is an alkyl group containing from 2 to 8 carbon atoms and R₆ is from the group consisting of hydrogen and methyl.

8. 3-butylmercapto propyl orthosilicate.
9. 2-butylmercapto ethyl orthosilicate.
10. 3-propylmercapto propyl orthosilicate.
11. 1-methyl-2-(butylmercapto) ethyl orthosilicate.
12. 2-(2-ethylhexylmercapto) ethyl orthosilicate.
13. A process of producing orthosilicate esters, which comprises reacting an alkylmercapto alkanol, the alkyl group of which contains from 2 to 8 carbon atoms and the alkanol contains from 2 to 5 carbon atoms with an esterification reagent from the group consisting of silicon tetrachloride and an alkyl orthosilicate the alkyl groups of which each contain from 1 to 4 carbon atoms, in the proportion of at least 4 mols of said alkylmercapto alkanol per mol of said esterification reagent.
14. A process of producing orthosilicate esters, which comprises reacting an alkylmercapto alkanol of the formula

RSR⁷OH in which R is an alkyl group containing from 2 to 8 carbon atoms and R⁷ is an alkylene radical containing from 2 to 5 carbon atoms with an alkyl orthosilicate having the formula Si(OR⁸)₄ in which R⁸ is an alkyl group containing from 1 to 4 carbon atoms in the proportions of at least 4 mols of said alkylmercapto alkanol per mol of said alkyl orthosilicate.

15. A process of producing orthosilicate esters, which comprises reacting silicon tetrachloride with an alkylmercapto alkanol in which the alkyl group contains from 2 to 8 carbon atoms in the proportion of at least 4 mols of said alkanol per mol of silicon tetrachloride.

16. The process as defined in claim 15, in which the reaction is carried out in the presence of a reagent capable of combining with the hydrogen chloride as it is liberated.

17. The process as defined in claim 15, in which the reaction is carried out in the presence of tertiary base capable of combining with the hydrogen chloride as it is liberated.

18. The process as defined in claim 15, in which the reaction is carried out in the presence of a low boiling inert reaction medium and the reaction mixture is refluxed to remove hydrogen chloride along with said inert reaction medium, the mixture being condensed and the inert reaction medium returned as reflux while the hydrogen chloride is allowed to escape.

19. The process as defined in claim 15, in which the reaction is carried out in the presence of methylene chloride, the reaction mixture is refluxed to drive off the hydrogen chloride and methylene chloride as vapors which are condensed, the methylene chloride being returned while the hydrogen chloride is allowed to escape.

References Cited in the file of this patent

UNITED STATES PATENTS

| | | |
|---|---|---|
| 2,465,339 | Schreiber | Mar. 29, 1949 |
| 2,562,474 | Orkin | July 31, 1951 |
| 2,592,175 | Orkin | Apr. 8, 1952 |
| 2,626,957 | Orkin | Jan. 27, 1953 |